United States Patent [19]

Gute

[11] Patent Number: 5,027,861

[45] Date of Patent: Jul. 2, 1991

[54] FLOW CONTROL FITTING ENABLING HIGH FLOW RATES

[75] Inventor: Robert M. Gute, Corunna, Mich.

[73] Assignee: Huron Products Corporation, Mt. Clemens, Mich.

[21] Appl. No.: 605,918

[22] Filed: Oct. 30, 1990

Related U.S. Application Data

[63] Continuation of Ser. No. 319,961, Mar. 7, 1989, Pat. No. 4,986,312.

[51] Int. Cl.⁵ .............................. F16L 1/14; B05B 1/26
[52] U.S. Cl. ...................................... 138/45; 138/43; 138/44; 138/46
[58] Field of Search .................. 138/40, 41, 44, 45, 138/46, 43; 239/533.1, 533.13, 533.14; 137/517

[56] References Cited

U.S. PATENT DOCUMENTS

| | | | |
|---|---|---|---|
| 2,728,355 | 12/1955 | Dahl | 138/45 |
| 2,815,041 | 12/1957 | Rimsha et al. | 138/45 |
| 2,829,674 | 4/1958 | Segelhorst et al. | 138/45 |
| 2,878,836 | 3/1959 | Binks | 138/45 |
| 3,995,664 | 12/1976 | Nelson | 138/43 |
| 4,508,144 | 4/1985 | Bernett | 138/45 |
| 4,609,014 | 9/1986 | Jurjevic et al. | 138/45 |
| 4,667,700 | 5/1987 | Buzzi | 138/45 |
| 4,754,897 | 7/1988 | Grace | 138/45 |

Primary Examiner—James E. Bryant, III
Attorney, Agent, or Firm—Harness, Dickey & Pierce

[57] ABSTRACT

A fluid controller has a disk-shaped body member with a positioning mechanism and lip mechanism. The controller is unitary and when positioned in a fluid flow in a first position enables fluid to flow through an axial bore in the disk-shaped member and around the disk member and in a second position enables fluid flow only through the axial bore.

8 Claims, 2 Drawing Sheets

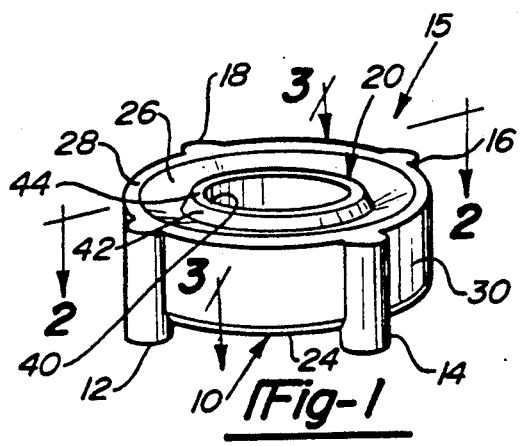
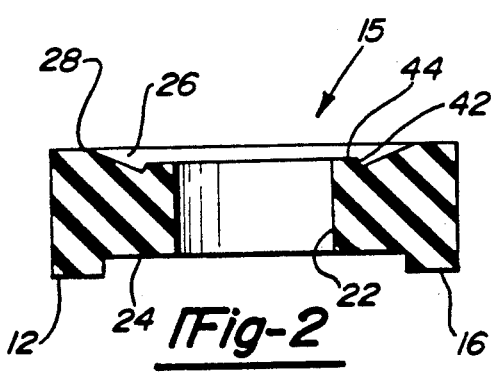
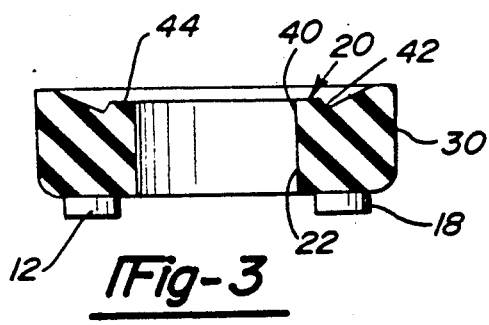
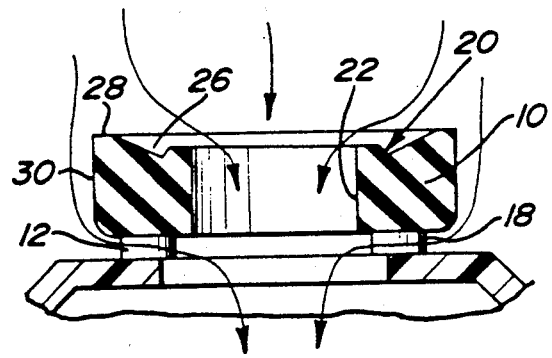
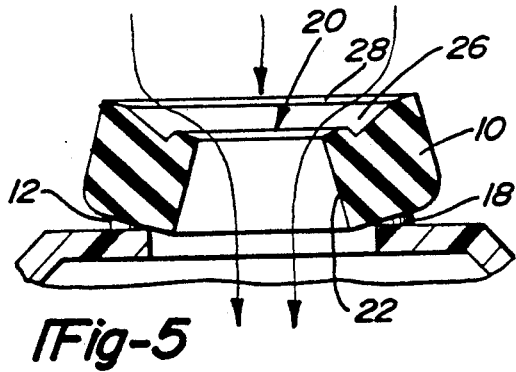
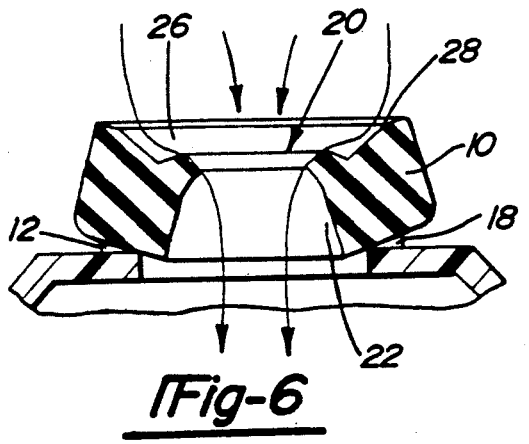

FLOW CONTROL FITTING ENABLING HIGH FLOW RATES

This is a continuation of U.S. Pat. application Ser. No. 319,961, filed Mar. 7, 1989, now U.S. Pat. No. 4,986,312.

BACKGROUND AND SUMMARY OF THE INVENTION

The present invention relates to a flow controller and, more particularly, to a flow control washer.

Several different applications exist for washer-type flow controllers. Particularly, in the automotive industry, especially in heating systems, it is desirable to enable fluid to flow as rapidly as possible through a conduit or heater core until a desired flow rate is achieved. Once the desired flow rate is achieved, the flow rate should be maintained at the desired level as pressure increases.

In automotive heating systems where fluids such as antifreeze, glycol or the like are used, it is important to have a rapid flow rate through the system at relatively low pressures. A rapid flow rate at low pressure enables fluid to pass through the heating system to "heat up" faster and, thus, enable warm air to be released into the vehicle passenger compartment.

To accomplish relatively high flow rates at relative low pressure, since the controller itself is a restriction in the conduit, a washer controller must enable maximum fluid flow passage through the conduit. As the pressure of the fluid in the conduit increases, the flow rate through the conduit increases. The washer controller enables the flow rate to increase at a desired rate until the desired flow rate is achieved then the controller maintains the flow rate at the desired level as the pressure in the conduit continues to increase.

Relevant art devices that are utilized in flow control like those illustrated in the following patents. The patents are as follows: U.S. Pat. Nos. 2,454,929, Nov. 30, 1948 to Kempton; 2,667,900, Feb. 2, 1954 to Cantalupo; 2,716,427, Aug. 30, 1955 to Cantalupo; 2,728,355, Dec. 27, 1955 to Dahl; 2,775,984, Jan. 1, 1957 to Dahl; 2,878,836, Mar. 24, 1959 to Binks; 2,891,578, Jun. 23, 1959 to Dahl et al.; 2,899,979, Aug. 18, 1959 to Dahl et al.; 2,936,790, May 17, 1960 to Dahl et al.; 2,948,300, Aug. 9, 1960 to Fraser; 3,141,477, Jul. 21, 1964 to Campbell et al.; 3,474,831, Oct. 28, 1969 to Noakes; 4,508,144, Apr. 2, 1985 to Bernett; 4,609,014, Sept. 2, 1986 to Jurjevic et al.; Re. 24,534, Sept. 16, 1958 to Dahl.

While the above patents may perform satisfactorily for their intended purpose, designers strive to improve the art. Thus, the present invention provides the art with a washer-type control device which enables maximum flow at low pressures and a constant desired flow as pressure continues to increase.

From the subsequent detailed description taken in conjunction with the accompanying drawings, other objects and advantages of the present invention will become apparent to those skilled in the art.

BRIEF DESCRIPTION OF THE DRAWINGS

FIG. 1 is a perspective view of a fluid control device in accordance with the present invention.

FIG. 2 is a vertical cross-section view of FIG. 1 through the plane designated by line 2—2 thereof.

FIG. 3 is a vertical cross-section view of FIG. 1 taken through the plane designated by line 3—3 thereof.

FIG. 4 is a vertical cross-section view like that of FIG. 3 illustrating low pressure flow through the device.

FIG. 5 is a vertical cross-section view like that of FIG. 4 illustrating medium pressure flow through the device.

FIG. 6 is a vertical cross-section view like that of FIG. 4 illustrating high pressure flow through the device.

DETAILED DESCRIPTION OF THE PREFERRED EMBODIMENT

Figure 7:
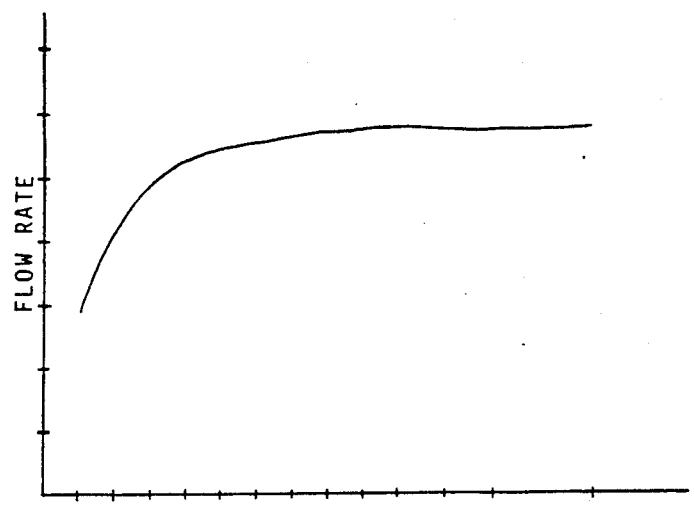
FIG. 7 is a graph illustrating flow rate with respect to pressure.

Referring to the Figures, particularly FIG. 1, a flow control device 15 is illustrated. The flow control device 15 generally includes a body member 10 with one or more positioning members 12, 14, 16, 18 and a lip 20.

The body 10 is disk shaped having a pair of major faces 24 and 26 with an axial bore 22 therethrough. Major face 24 is substantially planar. Major face 26 is inwardly tapered at the angle of from about 21° to about 25° and preferably at about 23°. The innermost periphery of the taper abuts the lip 20. Major face 26 also includes an outer planar ring 28 at the outer periphery of the taper. The outer planar ring 28 is substantially parallel with major face 24.

The positioning members 12-18 are unitarily formed with the disk member 10. The positioning members 12-18 project from the exterior circumferential wall 30 of the disk member 10. The tops of positioning members 12-18 are ordinarily flush with the planar ring 28 and extend beyond planar major face 24 providing the disk member 10 with one or more legs. The positioning members 12-18 position the disk 10 circumferentially and axially away from a wall, housing or the like. The positioning members 12-18 enable fluid to flow around and under the disk member 10 as illustrated in FIG. 4. It should be noted that four positioning members are illustrated, however, a lesser number may be used as long as they provide for fluid to flow around and under the disk member 10.

The lip 20 is positioned peripherally about the axial bore 22. The lip 20, in cross-section, has a frustrum shape. One side wall 40 of the frustrum is continuous with the interior wall of the axial bore 22. The other side wall 42 of the frustrum extends at an angle from about 26° to about 31°, preferably at 28.8°, with respect to side wall 40. The top surface 44 of the frustrum is substantially planar and forms an annular ring about the axial bore. Side wall 42 and the tapered major face 26 form an obtuse angle with respect to one another.

The lip 20 projects from the innermost portion of the taper such that the top surface ring 44 is in a plane parallel with and below a plane defined by the ring 28. Thus, the lip 20 does not extend beyond a plane defined by the planar ring 28. The lip 20 is generally positioned such that the top surface ring 44 is located a distance of approximately 0.58 millimeters below the plane of the planar ring 28. This positioning prevents the lip 20 from collapsing or sphinctering closed terminating flow. Also, the lip 20 provides a flow area through the axial bore 22, at high pressure, to insure the desired constant flow rate as illustrated by the graph of FIG. 7.

As low pressure fluid flows through the device, the fluid flow passes through the axial bore 22 and around and the disk member 10 as illustrated in FIG. 4. As the pressure increases in the fluid flow, the disk member 10 and positioning means 12-18 deflect pressing against a wall terminating the flow from around the disk member 10 as seen in FIG. 5. As the pressure of the fluid flow continues to increase, the lip 20 deflects into the axial bore 22 maintaining the fluid flow at a desired rate as illustrated in FIG. 6.

The disk member !0, positioning members 12-18 and lip 20 are unitarily formed from an elastomeric resilient material. Generally, the elastomeric material is of a durometer of between 65-75. The elastomer is generally of a medium high acrylic content nitrile rubber, black-loaded compound. The tensile strength of the material is generally from about 1800 to 2600 psi. The percent elongation of the material is between 380 to 520 percent. The modulus of elasticity of the material at 100 percent is between 375 psi to 525 psi; at 200 percent it is between 950 psi to 1250 psi; at 300 percent, it is between 1500 psi to 2000 psi. The percent flow area underneath the positioning members and around the disk member is about 57 percent of the flow at low pressure while the flow through the axial bore is approximately 43 percent of the flow.

Figure 8:
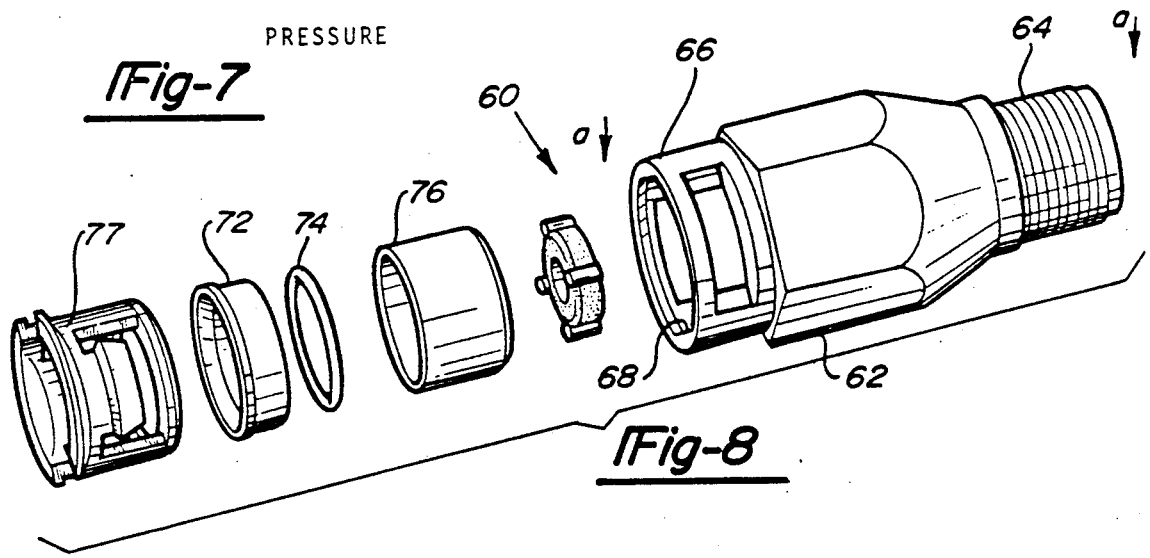
FIG. 8 is an exploded perspective view of a fitting in accordance with the present invention.
Figure 9:
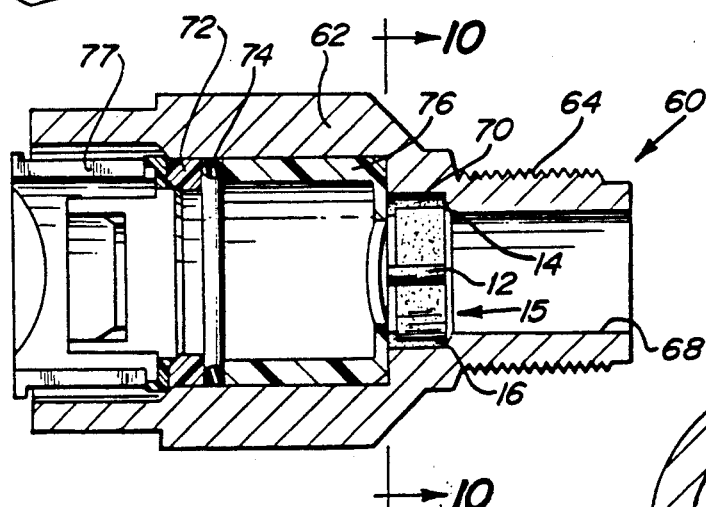
FIG. 9 is a vertical axial cross-section view of the assembled device of FIG. 8 through the plane designated by line 9—9 thereof.
Figure 10:
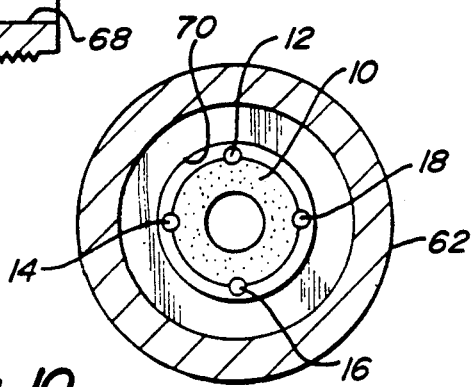
FIG. 10 is a vertical transverse cross-section view of the assembled fitting of FIG. 9 through the plane designated by line 10—10 thereof.

Turning to FIGS. 8-10, the flow controller is illustrated with a fitting 60. The fitting 60 generally includes a housing 62 having a pair of ends 64 and 66 and an axial bore 68 running through the entire housing 62. The ends 64 and 66 are adapted to readily connect to a conduit or the like. In the embodiment shown, end 64 has a threaded exterior and end 66 is adapted with a quick connect mechanism. The axial bore 68 has a stepped design having a step 70 to receive the flow controller 15 as seen in FIGS. 9 and 10. A retainer 72, O-ring 74 and a flow controller positioning member 76 are positioned within the fitting 60. Also, a quick connect retainer 77 is coupled with end 66. When the elements are secured in the housing 62, the flow controller 15 is sandwiched between the step 70 and positioning member 76. As can be seen in FIGS. 9 and 10, the positioning members 12, 14, 16 and 18 maintain the disk member 10 away from the housing wall 70 and the retainer 76.

While the above detailed description discloses the preferred embodiment of the present invention, it will be understood that the present invention is susceptible to modification, alteration and variation without departing from the scope and fair meaning of the subjoined claims.

What is claimed is:

1. A flow control fitting comprising:

a housing having two ends and an axial bore through said housing from end to end, both ends including means adapted for securing said housing into a fluid flow, means for receiving a flow control, said receiving means integral with said housing;

a disk-shaped member including an axial bore, said disk-shaped member includes a pair of faces, one of said faces being non-tapered defining an outlet side and the other side being inwardly tapered toward said axial bore and defining an inlet side with said fluid flow passing from said tapered face toward said non-tapered face;

means for positioning said disk-shaped member a desired distance from said housing such that in a first position in the fluid flow, fluid would be enabled to pass through said axial bore and around said disk-shaped member between the exterior of the disk-shaped member and the housing, in a second position fluid would be enable to pass through only said axial bore, said positioning means including a plurality of leg members projecting from said nontapered face of disk-shaped body at spaced locations such that said legs project axially and radially from said disk-shaped body, said positioning means coupled with said disk-shaped body, said positioning means coupled with said disk-shaped member; and metering means adapted for metering fluid flow through said axial bore, said metering means positioned peripherally about an end of said disk-shaped member axial bore on said tapered face.

2. The flow control according to claim 1 wherein said metering means is manufactured from a resilient elastomeric material.

3. The flow control according to claim 1 wherein said taper is at an angle of from about 21° to about 25° with respect to a plane transverse to said axial bore.

4. The flow control according to claim 1 wherein said disk-shaped member, positioning means and metering means are of unitary construction.

5. The flow control according to claim 1 wherein said metering means is further comprised of an annular member having in cross-section a frustrum shape.

6. The flow control according to claim 5 wherein a side of the annular member is continuous with an internal side of said disk-shaped member defining said axial bore and an opposing side of said annular member being at an angle of from about 26° to about 31° with said continuous side of said annular member.

7. The flow control according to claim 1 wherein said metering means extends from said tapered face such that the metering means extends below a plane defined by the outer most end of said taper.

8. The flow control according to claim 1 further comprising means for retaining said disk-shaped member in said housing.

* * * * *

UNITED STATES PATENT AND TRADEMARK OFFICE
CERTIFICATE OF CORRECTION

PATENT NO. : 5,027,861

DATED : July 2, 1991

INVENTOR(S) : Robert M. Gute

It is certified that error appears in the above-identified patent and that said Letters Patent is hereby corrected as shown below:

Column 1, line 38, delete "that".

Column 2, line 25, delete "With" and substitute --with--.

Column 3, line 7, delete "and".

Column 4, line 19, Claim 1, delete "enable" and substitute --enabled--.

Column 4, line 27, Claim 1, "metering means" should begin a new paragraph.

Signed and Sealed this

Seventh Day of December, 1993

*Attest:*

BRUCE LEHMAN

*Attesting Officer*     *Commissioner of Patents and Trademarks*